United States Patent
Li et al.

(10) Patent No.: US 8,675,530 B2
(45) Date of Patent: Mar. 18, 2014

(54) METHOD FOR ENHANCING POWER SAVING PERFORMANCE OF USER EQUIPMENT

(75) Inventors: Guoqing Li, Beijing (CN); Li Chen, Beijing (CN); Zhuo Gao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 191 days.

(21) Appl. No.: 13/127,210

(22) PCT Filed: Nov. 3, 2009

(86) PCT No.: PCT/CN2009/074767
§ 371 (c)(1),
(2), (4) Date: Jul. 18, 2011

(87) PCT Pub. No.: WO2010/060341
PCT Pub. Date: Jun. 3, 2010

(65) Prior Publication Data
US 2011/0268003 A1    Nov. 3, 2011

(30) Foreign Application Priority Data
Nov. 3, 2008   (CN) .......................... 2008 1 0225699

(51) Int. Cl.
*G08C 17/00* (2006.01)
(52) U.S. Cl.
USPC ............................. 370/311; 370/321; 714/749

(58) Field of Classification Search
None
See application file for complete search history.

(56) References Cited

U.S. PATENT DOCUMENTS

| | | | |
|---|---|---|---|
| 2003/0028837 A1 | 2/2003 | Oh | |
| 2008/0137689 A1* | 6/2008 | Shiizaki et al. | 370/498 |
| 2009/0238105 A1* | 9/2009 | Wu et al. | 370/311 |
| 2010/0037114 A1* | 2/2010 | Huang et al. | 714/749 |

FOREIGN PATENT DOCUMENTS

| | | |
|---|---|---|
| CN | 101222309 A | 7/2008 |
| CN | 101483884 A | 7/2009 |
| WO | WO 2008/097965 A2 | 8/2008 |

* cited by examiner

*Primary Examiner* — Steven H Nguyen
*Assistant Examiner* — Henry Baron
(74) *Attorney, Agent, or Firm* — LaRiviere, Grubman & Payne, LLP

(57) ABSTRACT

A method for enhancing power saving performance of user equipment (UE) is provided. The method includes the following steps: a UE receives the downlink data transmitted by an evolved node B (eNB); the UE starts a corresponding RTT Timer according to the received downlink data, the timing of the RTT Timer is determined based on the uplink/downlink (UL/DL) configuration and the sub-frame number of the downlink sub-frame carrying the downlink data by the UE; and the UE controls the discontinuous reception (DRX) process according to the RTT Timer. By re-defining the RTT Timer, the present invention can improve power saving performance of the UE in TDD system effectively.

8 Claims, 8 Drawing Sheets

METHOD FOR ENHANCING POWER SAVING PERFORMANCE OF USER EQUIPMENT

FIELD OF THE INVENTION

The invention relates to a mobile communication field, in particular to a method for enhancing power saving performance of user equipment (UE).

BACKGROUND OF THE INVENTION

In order to save power of the UE and prolong its standby time, a Discontinuous Receive (DRX) mechanism is introduced, which only requires to discontinuously monitor the control channel of Evolved Node B (eNB) instead of a continuous monitoring when the UE is in a connection state.

FIG. 1 schematically shows the principle of DRX in a Long Term Evolution (LTE) system of the prior art. Here, the term "On Duration" represents a time period in which the UE monitors the control channel, during which the radio frequency channel of the UE is open and the control channel is monitored continuously. During the rest of the time period, the UE is in a Sleep state and the radio frequency link of which will be shut down so as to save power. Usually, the "On Duration" is periodical, and its cycle is configured by the eNB. In order to avoid a large time delay of communication between the eNB and the UE during the power saving of the UE, the concepts "long cycle" and "short cycle" are both introduced. In the short cycle, "On Duration" appears more frequently than in the long cycle. The long cycle and the short cycle can be configured simultaneously to shorten the time during with the UE monitors the control channel, thereby reducing the time delay during data transmission.

In order to perform DRX operation, a plurality of Timers are designed for the LTE, and an operation process in the DRX state is given in combination with a Hybrid Automatic Request (HARQ) process, the related Timers include:

1. Inactivity Timer: this Timer is started when the UE receives a control signal transmitted initially by the HARQ during the "On Duration". Before this Timer expires, the UE continuously monitors the control channel. If the UE receives the control signal transmitted initially by the HARQ before the inactivity Timer expires, then the inactivity Timer will be stopped and restarted.

2. RTT Timer: it is only suitable for downlink (DL). If the UE receives the control signal retransmitted by the HARQ, this Timer is started. If data corresponding to the HARQ process has not been decoded successfully after the previous transmission of the HARQ, the UE is started a retransmission Timer after the RTT Timer expires. If data corresponding to the HARQ process are decoded successfully after the previous transmission of the HARQ, the UE does not start the retransmission Timer after the RTT Timer expires.

3. Retransmission Timer: during the retransmission Timer is started, the UE monitors the control channel and is waiting for the retransmission corresponding to the HARQ process.

FIG. 2 schematically shows each Timer's action during the DRX process in the prior art. As shown in FIG. 2, firstly On duration Timer is running, during which the eNB schedules the initial transmission of the DL at the time t1, so the Inactivity Timer is running and the HARQ RTT Timer is started. At the time t2, the Inactivity Timer expires. At the time t3, the HARQ RTT Timer expires. As the initial transmission at the time t1 is not successful (the UE feeds NACK back), the Retransmission Timer is started. At the time t4, the eNB schedules the first retransmission, thus the Retransmission Timer is stopped and the RTT Timer is started. At the time t6, the RTT Timer expires, and the first retransmission at the time t4 is still not successful (the UE feeds NACK back), thus the Retransmission Timer is started. At the time t7, the eNB schedules the second retransmission, thus the Retransmission Timer is stopped and the RTT Timer is started. As the second retransmission is successful (the UE feeds ACK back), the Retransmission Timer will not be started after the RTT Timer expires.

It can be known from FIG. 2 and the above process that the RTT Timer can increase the time during which the UE is in the sleep state, such as the time period T1 and T2 in FIG. 2. The RTT Timer could be set to control the UE is in the sleep state between two transmissions by setting, so that the UE enter the monitoring state at a suitable time.

The disadvantages of the prior art lie in: in the current LTE system, the setting time for the RTT Timer is 8 ms, which equals to the minimum transmission time interval of the Frequency Division Duplex (FDD) system. As eNB can only schedule the retransmission after this 8 ms minimum transmission time interval, the 8 ms RTT Timer is a relatively optimized design for the FDD system. But for the Time Division Duplex (TDD) system, there is a problem. As the minimum downlink transmission time interval of the TDD system is related to both UL/DL configuration and the sub-frame number of the downlink sub-frame, it is not always applicable for the TDD system to set the RTT Timer to be 8 ms, which will increase the power consumption of UT and not be disadvantageous to the power saving performance of UE.

SUMMARY OF THE INVENTION

The object of the present invention aims to overcome at least one of the above technical defects, in particular to solve the technical problem that the power consumption of the UE increases as the RTT Timer is set to a fixed value.

In order to realize the above objects, one aspect of the present invention provides a method for enhancing the power saving performance of UE. The method includes the following steps: a UE receives the downlink data transmitted by an evolved node B (eNB); the UE starts a corresponding RTT Timer according to the received downlink data, the timing of the RTT Timer is determined based on the uplink/downlink (UL/DL) configuration and the sub-frame number of the downlink sub-frame carrying the downlink data by the UE; and the UE controls the discontinuous reception (DRX) process according to the RTT Timer.

Another aspect of the present invention further provides a UE, which includes a downlink data receiving module, a Timer starting module, and a DRX process control module, wherein the downlink data receiving module is configured for receiving the downlink data transmitted by the eNB; the Timer starting module is configured for starting a corresponding RTT Timer according to the downlink data received by the downlink data receiving module, the timing of the RTT Timer is determined based on the uplink/downlink (UL/DL) configuration and the sub-frame number of the downlink sub-frame carrying the downlink data by the UE; and the DRX process control module is configured for controlling the DRX process according to the RTT Timer.

The present invention further provides a method for enhancing power saving performance of UE. The method includes the following steps: a UE receives the downlink data transmitted by an eNB; when the UE determines that the downlink data transmission is not successful, the UE feeds NACK back to the eNB and the UE starts a RTT Timer; and the UE controls the DRX process according to the RTT Timer, and starts a Retransmission Timer after the RTT Timer expires.

The present invention further provides a UE, which includes a downlink data receiving module, a determining module, a feedback module and a DRX process control module, wherein the downlink data receiving module is configured for receiving the downlink data transmitted by the eNB; the determining module is configured for determining whether the downlink data transmission is successful or not; the feedback module is configured for feeding ACK back to the eNB when the determining module determines that the downlink data transmission is successful, and is configured for feeding NACK back to the eNB when the determining module determines that the downlink data transmission is unsuccessful, and the RTT Timer is started at the same time; and the DRX process control module is configured for controlling the DRX process according to the RTT Timer, and starting a Retransmission Timer after the RTT Timer expires.

By re-defining the RTT Timer, the present invention can improve power saving performance of the UE in TDD system effectively.

The additional aspects and advantages of the present invention will be given in the following description and part of them will become apparent form the following description or can be acquired through examples of the present invention.

BRIEF DESCRIPTION OF THE DRAWINGS

The above and/or additional aspects and advantages of the present invention will become apparent and easily understandable from the description hereinafter to the embodiments in conjunction with the drawings, in which FIG. 1 schematically shows a principle of DRX in LTE system of the prior art.

DETAILED DESCRIPTION OF THE PRESENT INVENTION

Hereafter the embodiments of the present invention are described in detail, and the examples of the embodiments are shown in figures. Throughout the description, the same or similar reference numbers are assigned to the same or similar components or the components having the same or similar functions. The following embodiments are taken as example with reference to figures and are only used to explain the present invention rather than being construed as limitation to the present invention.

In combination with the structure of the TDD frame, different RTT Timers are provided in the embodiments of the present invention according to different sub-frame number of the downlink transmission and the uplink/downlink (UL/DL) configuration, so as to enhance power saving performance of the UE effectively.

For a clear and complete understanding of the present invention, hereafter the setting to the RTT Timer will be introduced in conjunction with the structure of the TDD frame.

Figure 1:
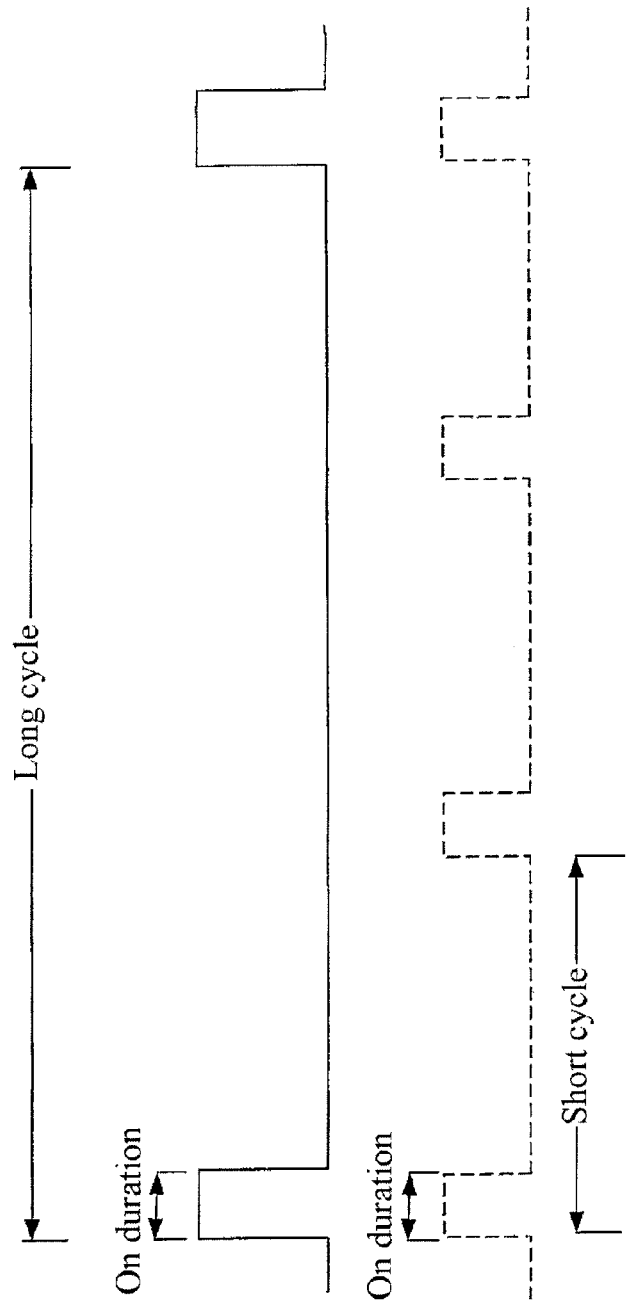
Figure 2:
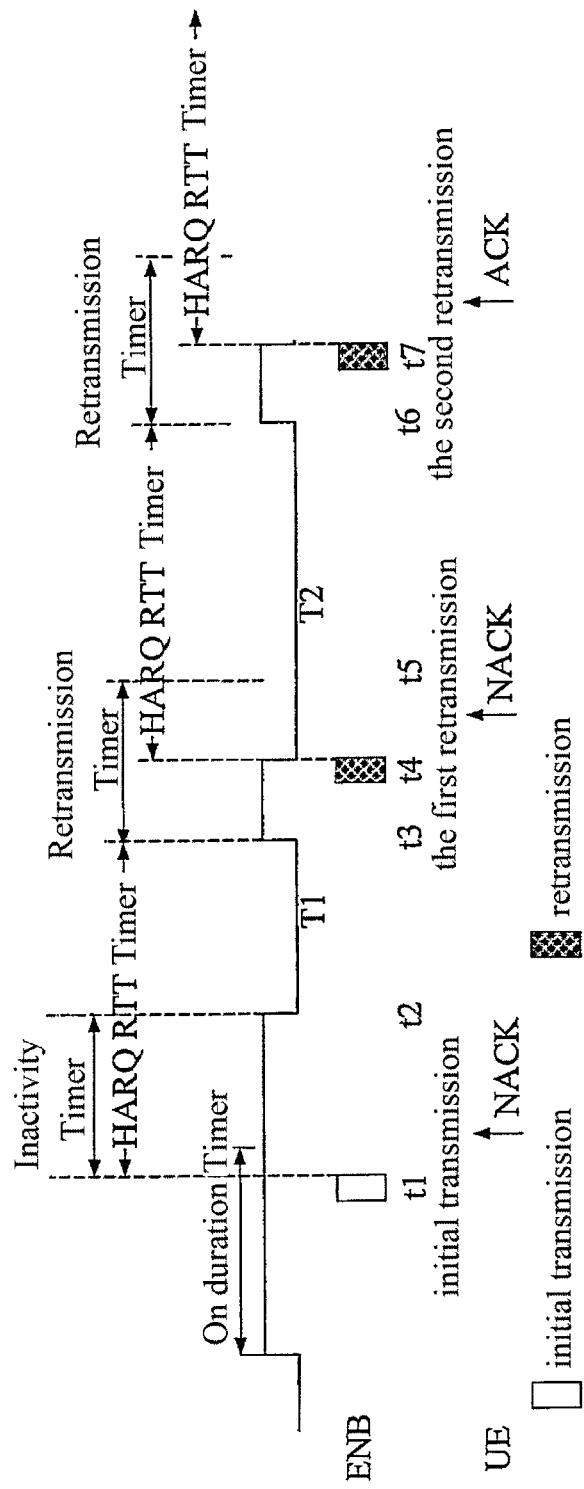
FIG. 2 shows each Timer's action during DRX process in the prior art.
Figure 3:
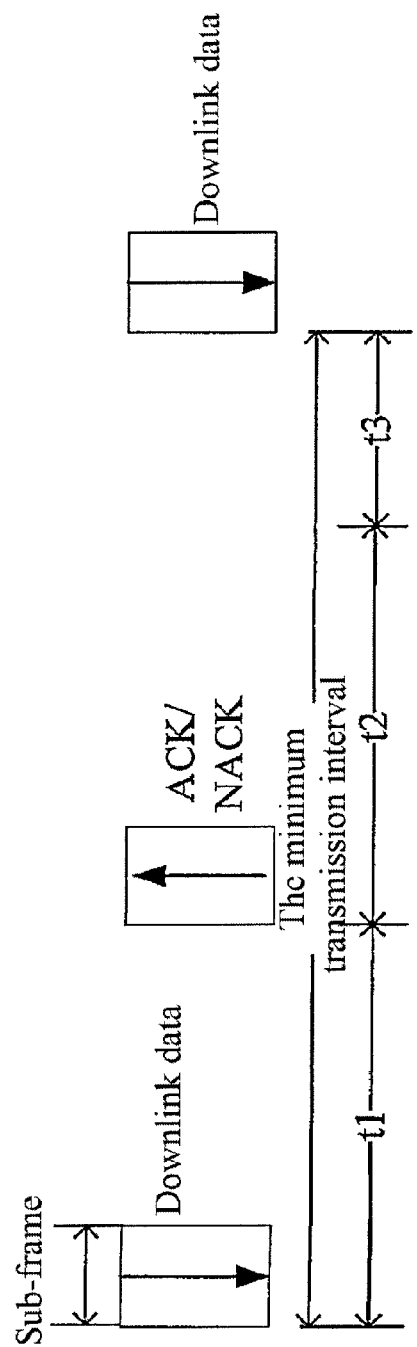
FIG. 3 shows a scheduling sequence of downlink retransmission in LTE system, FIG. 4 schematically shows a structure of TDD frame.

LTE system is a system based on scheduling. In the LTE system, both uplink and downlink resource transmissions are scheduled at the base station side, and the UE is informed by a scheduling command. During a scheduling procedure, the processing delays of the base station and the UE are taken into account sufficiently, so that an effective scheduling can be realized. FIG. 3 schematically shows a delay requirement for a downlink retransmission scheduling in LTE system. As shown in FIG. 3, the minimum transmission interval=t1+t2+t3, wherein t1 is the downlink data transmission time+a delay of data processing of UE; t2 is the time during which the UE transmits a feedback+a delay of data processing of eNB; t3 is a delay caused by the frame structure (only TDD system has t3, t3 is zero for FDD system). The downlink data transmission time and the time during which the UE transmits a feedback are set to one frame, namely 1 ms; delays of data processing of eNB and of UE are set to 3 ms. Thus, the minimum transmission interval for FDD system is t1+t2=1+3+1+3=8 ms according to the above formula.

Figure 4:
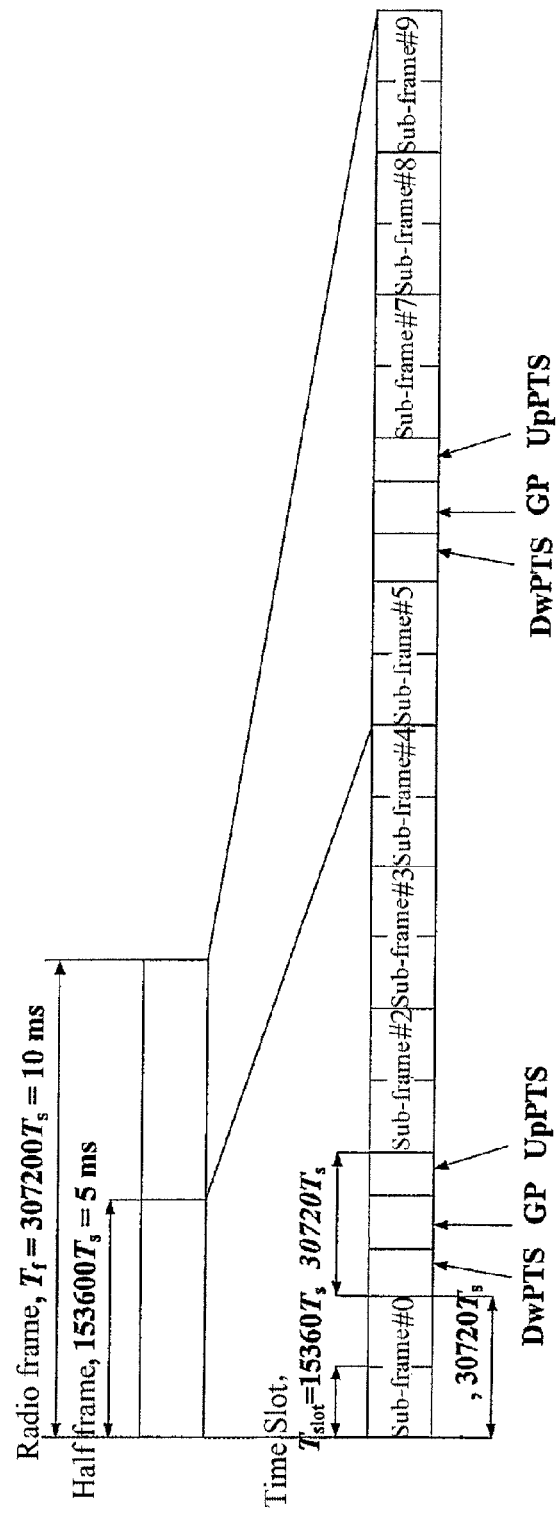

FIG. 4 schematically shows a structure of TDD frame. As shown in FIG. 4, each radio frame consists of two half-frames each of which has a length of 5 ms. Each half-frame contains eight time slots, each of which has a length of 0.5 ms, and three special time slots, DwPTS, GP and UpPTS. The lengths of DwPTS and UpPTS are configurable, and the total length of DwPTS, GP and UpPTS is required to be 1 ms. Sub-frame 1 and sub-frame 6 contain DwPTS, GP and UpPTS respectively, and all other sub-frames contain two adjacent time slots, wherein the ith sub-frame is composed of the 2i and 2i+1 time slots. Sub-frame 0 and sub-frame 5 as well as DwPTS are always reserved for downlink transmission.

Table 1 shows the current standard time slot ratio configuration

TABLE 1 time slot ratio configuration in TDD

| configuration | Sub-frame number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

The following table 2 shows timing relationship of the uplink feedback direction with respect to downlink transmission, wherein the numbers in the table 2 indicates the number of sub-frames, the previous downlink sub-frame at the front of which carries the transmission fed back by this uplink sub-frame. For example, the sub-frame 2 of the UL-DL configuration 2 corresponds to the number (8, 7, 6, 4), which indicates that the downlink transmissions before (8, 7, 6, 4) sub-frames are fed back in this uplink sub-frame. That is, the downlink transmissions performed by sub-frames 4, 5, 6, 8 in the previous radio frame are all fed back in the sub-frame 2.

TABLE 2 timing relationship of the uplink feedback direction
with respect to downlink transmission

| UL-DL configuration | Sub-frame number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 6, 4 | — | — | — | — | 8, 7, 6, 4 | — | — |
| 3 | — | — | 11, 7, 6 | 6, 5 | 5, 4 | — | — | — | — | — |
| 4 | — | — | 12, 11, 8, 7 | 7, 6, 5, 4 | — | — | — | — | — | — |
| 5 | — | — | TBD | — | — | — | — | — | — | — |
| 6 | — | — | 7 | 7 | 5 | — | — | 7 | 7 | — |

Thus, the minimum transmission time interval for TDD system may be: downlink data transmission time (1 ms)+a delay of feedback to downlink transmission (numbers in table 2)+a delay of data processing of eNB (3 ms)+the uplink sub-frames spaced from the latest downlink sub-frame. The delay of feedback to downlink transmission (i.e., numbers in table 2) already includes the feedback time transmitted by the UE (1 ms). The above "the uplink sub-frames spaced from the latest downlink sub-frame" is determined by the structure uplink and downlink sub-frames of TDD alternately appearing. If the time when eNB has processed feedback from the UE and has configured the retransmission data packet is just at an uplink sub-frame, then eNB has to wait for a downlink sub-frame to perform the retransmission scheduling.

Taking the 3 ms delay of the processing at the eNB side as an example, the downlink minimum transmission time interval is as shown in FIG. 3. Since the feedback relationship in the protocol has not been determined finally, the downlink minimum transmission time interval of configuration 5 cannot be determined. For example, in the UL/DL configuration 1, the downlink transmission transmitted at the downlink sub-frame 9 is fed back at the uplink sub-frame 3. The eNB can schedule retransmission at the sub-frame 7 after 3 ms. Due to the uplink sub-frame of the sub-frame 7, after the uplink sub-frames which is in the front of the next downlink sub-frame, i.e., sub-frames 7 and 8 (2 ms totally), the retransmission can be scheduled at the sub-frame 9, therefore minimum transmission interval=1+4+3+2=10 ms.

TABLE 3 downlink minimum transmission time interval of 3
ms delay of the processing at the eNB side (TDD)

| | | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| UL/DL configuration | 0 | 10 | 10 | — | — | — | 10 | 10 | — | — | — |
| | 1 | 11 | 10 | — | — | 10 | 11 | 10 | — | — | 10 |
| | 2 | 11 | 10 | — | 8 | 12 | 11 | 10 | — | 8 | 12 |
| | 3 | 8 | 15 | — | — | — | 11 | 10 | 10 | 9 | 9 |
| | 4 | 16 | 15 | — | — | 12 | 11 | 11 | 10 | 9 | 8 |
| | 5 | 16 | 15 | — | 13 | 12 | 11 | 10 | 9 | 8 | 17 |
| | 6 | 11 | 14 | — | — | — | 11 | 13 | — | — | 10 |

If the HARQ RTT Timer is 8 ms, then the number of DL sub-frames which UE monitors additionally in different configurations is as shown in table 4:

TABLE 4 the number of DL sub-frames which UE monitors additionally
in the condition of 8 ms HARQ RTT Timer

| | | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| UL/DL configuration | 0 | 0 | 1 | — | — | — | 0 | 1 | — | — | — |
| | 1 | 2 | 2 | — | — | 0 | 2 | 2 | — | — | 0 |
| | 2 | 2 | 2 | — | 0 | 3 | 3 | 2 | — | 0 | 3 |
| | 3 | 0 | 4 | — | — | — | 1 | 1 | 2 | 1 | 1 |
| | 4 | 6 | 5 | — | — | 2 | 2 | 3 | 2 | 1 | 0 |
| | 5 | | | | | TBD | | | | | |
| | 6 | 2 | 3 | — | — | — | 1 | 2 | — | — | 0 |

It can be seen from the above table 4 that the power consumption of UE in TDD system will increase when the 8 ms RTT Timer is only used.

With respect to the schematic view of the minimum transmission interval in FIG. 3, the present invention provides two methods for re-defining RTT Timer, which are introduced by means of the following embodiments Embodiment 1

In this embodiment, the time when UE starts the RTT Timer is the same as in the prior art. After receiving the downlink data transmitted by eNB, the UE starts the RTT Timer. However, in this embodiment, the timing of the RTT Timer in this embodiment is not fixed (8 ms), so that the UE determines the timing of the corresponding HARQ RTT Timer based on the sub-frame number of the downlink sub-frame carrying the downlink data and the uplink/downlink (UL/DL) configuration. Furthermore, for TDD system, the Retransmission Timer for downlink sub-frames is started after the HARQ RTT Timer expires, thus the number (t3) of uplink sub-frame immediately after the HARQ RTT Timer expires should not be taken into account. Therefore, the timing of the HARQ RTT Timer in TDD system equals to t1+t2. Even if an uplink sub-frame is immediately after the HARQ RTT Timer expires, the performance of DRX will not change as the UE does not monitor the downlink scheduling and transmission in uplink sub-frames.

Specifically, in one embodiment of the present invention, when a delay of the processing of eNB is 3 ms, UE inquires the following table 5 based on the uplink/downlink (UL/DL) configuration and the sub-frame number of the downlink sub-frame carrying the downlink data to determine the timing of the HARQ RTT Timer.

TABLE 5

HARQ RTT Timer where the delay of the processing at the eNB side is 3 ms (TDD system)

| | | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| UL/DL configuration | 0 | 8 | 10 | — | — | — | 8 | 10 | — | — | — |
| | 1 | 11 | 10 | — | — | 8 | 11 | 10 | — | — | 8 |
| | 2 | 11 | 10 | — | 8 | 12 | 11 | 10 | — | 8 | 12 |
| | 3 | 8 | 15 | — | — | — | 11 | 10 | 10 | 9 | 9 |
| | 4 | 16 | 15 | — | — | 12 | 11 | 11 | 10 | 9 | 8 |
| | 5 | 16 | 15 | — | 13 | 12 | 11 | 10 | 9 | 8 | 17 |
| | 6 | 11 | 11 | — | — | — | 11 | 11 | — | — | 9 |

Basing on the table 5 of HARQ RTT Timer related to DL sub-frame, when HARQ RTT Timer needs to be started, UE acquires the corresponding value of HARQ RTT Timer from the table according to the position where DL transmission occurs and the uplink/downlink (UL/DL) configuration.

Figure 5:
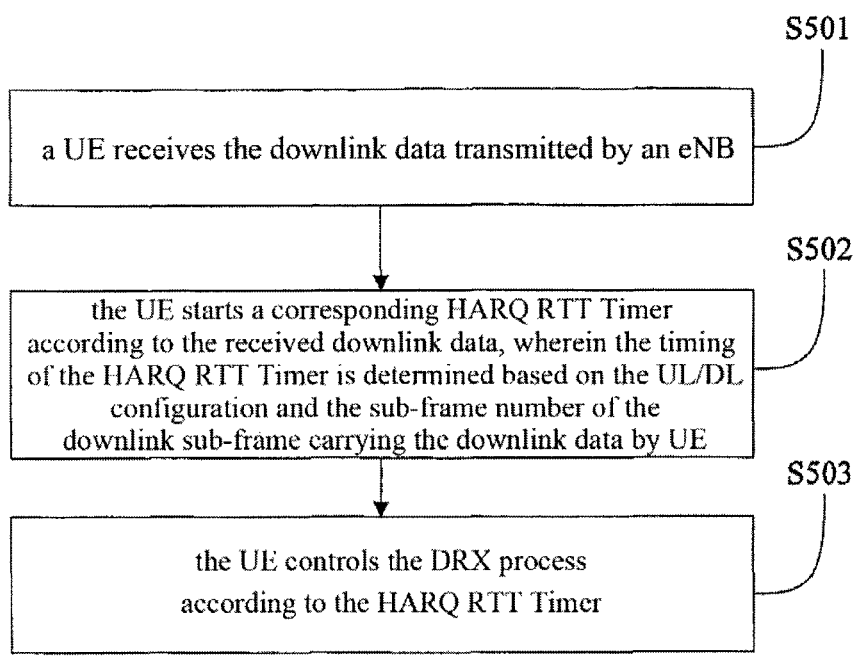
FIG. 5 shows the method for enhancing power saving performance of the UE according to the first embodiment of the present invention.

As shown in FIG. 5, it is a method for enhancing power saving performance of the UE, which comprises the following steps:

S501, an UE receives the downlink data transmitted by an eNB.

S502, the UE starts a corresponding HARQ RTT Timer according to the received downlink data, and the timing of the HARQ RTT Timer is determined by UE based on the UL/DL configuration and the sub-frame number of the downlink sub-frame carrying the downlink data.

The timing can be determined as k+4 sub-frames based on the UL/DL configuration and the sub-frame number of the downlink sub-frame carrying the downlink data, wherein k represents the interval between the downlink data transmission and the related HARQ feedback transmission. In particular, k sub-frames may include the transmission time of downlink data (e.g. 1 sub-frame), the maximum delay of data processing of UE (e.g. 3 sub-frames), as well as waiting time (as uplink and downlink sub-frames do not appear at the same time in TDD system, the UE has to wait for sub-frames in the suitable direction, for example the UE has to wait for uplink sub-frames for transmitting feedback of HARQ). In addition, 4 sub-frames may include the delay for transmitting the related HARQ feedback of UE (e.g. 1 sub-frame) and the maximum delay of data processing of eNB (e.g. 3 sub-frames).

Furthermore, the timing of the HARQ RTT Timer is the sum of downlink data transmission time, the delay of data processing of UE, the feedback transmission time of UE and the delay of data processing of eNB. More specifically, it can be determined by inquiring the table 5 based on the UL/DL configuration and the sub-frame number of the downlink sub-frame carrying the downlink data.

S503, the UE controls the DRX process through the HARQ RTT Timer.

Figure 6:
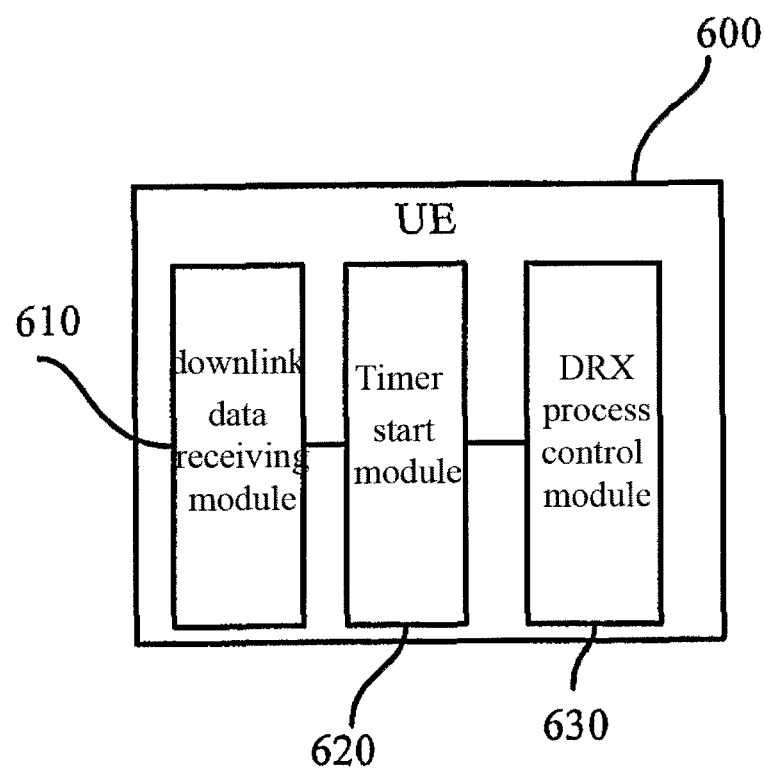
FIG. 6 shows the structure of the UE according to the first embodiment of the present invention.

FIG. 6 shows the structure of the UE according to the first embodiment of the present invention. The UE 600 includes a downlink data receiving module 610, a Timer start module 620, and a DRX process control module 630. The downlink data receiving module 610 is configured for receiving the downlink data transmitted by the eNB. The Timer start module 620 is configured for starting the corresponding RTT Timer according to the downlink data received by the downlink data receiving module 610. The timing of the RTT Timer is determined based on the UL/DL configuration and the sub-frame number of the downlink sub-frame carrying the downlink data. The DRX process control module 630 is configured for controlling the DRX process according to the RTT Timer.

In one embodiment of the present invention, the timing is determined by the Timer start module as k+4 sub-frames based on the UL/DL configuration and the sub-frame number of the downlink sub-frame carrying the downlink data, wherein k sub-frames may include the transmission time of downlink data (e.g. 1 sub-frame), the maximum delay of data processing of UE (e.g. 3 sub-frames), as well as waiting time (as uplink and downlink sub-frames do not appear at the same time in TDD system, the UE has to wait for sub-frames in the suitable direction, for example the UE has to wait for uplink sub-frames for transmitting feedback of HARQ). In addition, 4 sub-frames may include the delay for transmitting the related HARQ feedback of UE (e.g. 1 sub-frame) and the maximum delay of data processing of eNB (e.g. 3 sub-frames).

In one embodiment of the present invention, the timing of the HARQ RTT Timer is the sum of downlink data transmission time, the delay of data processing of UE, the feedback transmission time of UE and the delay of data processing of eNB. More specifically, when the delay of data processing of eNB is 3 ms, the timing of the HARQ RTT Timer is determined by inquiring the table 5 based on the UL/DL configuration and the sub-frame number of the downlink sub-frame carrying the downlink data.

Embodiment 2

This embodiment is different from the prior art and the embodiment 1 In this embodiment, the UE starts the HARQ RTT Timer and feeds NACK back to the eNB back simultaneously. Thus, in this embodiment, the timing of the HARQ RTT Timer does not include t1 any more. As the HARQ RTT Timer is started only when data is not received successfully, a Retransmission Timer has to starts after the HARQ RTT Timer expires so as to receive the following retransmission scheduling. As one embodiment of the present invention, values of the HARQ RTT Timer are the same both in FDD system and TDD system, e.g., 4 ms.

Figure 7:
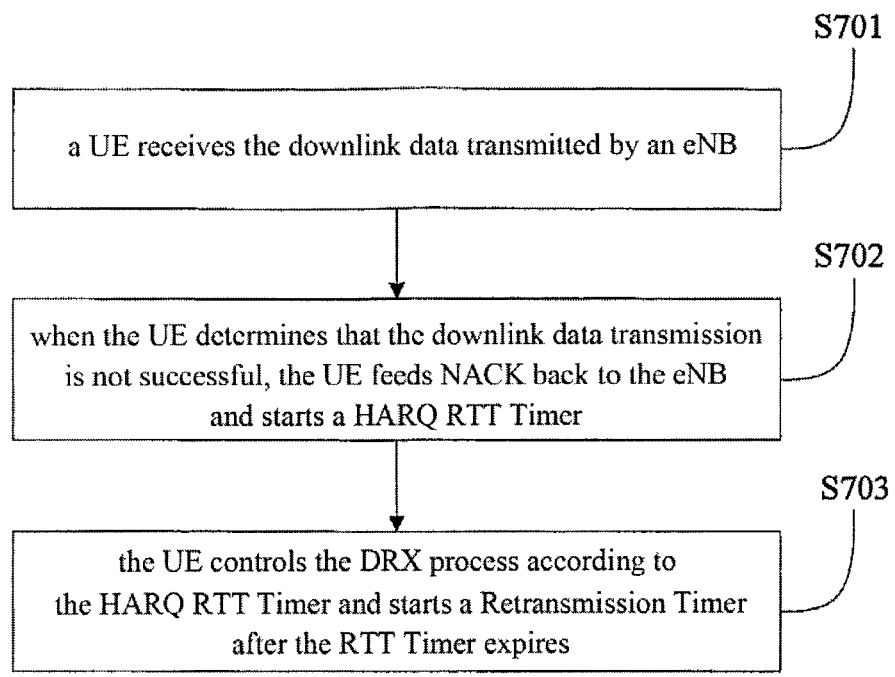
FIG. 7 shows the method for enhancing power saving performance of the UE according to the second embodiment of the present invention.

FIG. 7 is the flowchart showing the method for enhancing power saving performance of the UE according to the second embodiment of the present invention, which comprises the following steps:

S701, an UE receives the downlink data transmitted by an eNB.

S702, when the UE determines that the downlink data transmission is not successful, the UE feeds NACK back to the eNB, and the UE starts a HARQ RTT Timer.

In one embodiment of the present invention, the timing of RTT Timer is k+4 sub-frames, wherein k represents the interval between the downlink data transmission and the related HARQ feedback transmission. In particular, k sub-frames may include the transmission time of downlink data (e.g. 1 sub-frame), the maximum delay of data processing of UE (e.g. 3 sub-frames), as well as waiting time (as uplink and downlink sub-frames do not appear at the same time in TDD system, the UE has to wait for sub-frames in the suitable direction, for example the UE has to wait for uplink sub-frames for transmitting feedback of HARQ). In addition, 4 sub-frames may include the delay for transmitting the related HARQ feedback of UE (e.g. 1 sub-frame) and the maximum delay of data processing of eNB (e.g. 3 sub-frames).

In one embodiment of the present invention, the timing of the HARQ RTT Timer is the sum of feedback transmission time of UE and the delay of data processing of eNB.

More specifically, when the delay of data processing of eNB is 3 ms, the timing of the HARQ RTT Timer is 4 ms.

S703, the UE controls the DRX process according to the HARQ RTT Timer, and starts a Retransmission Timer after the RTT Timer expires.

Figure 8:
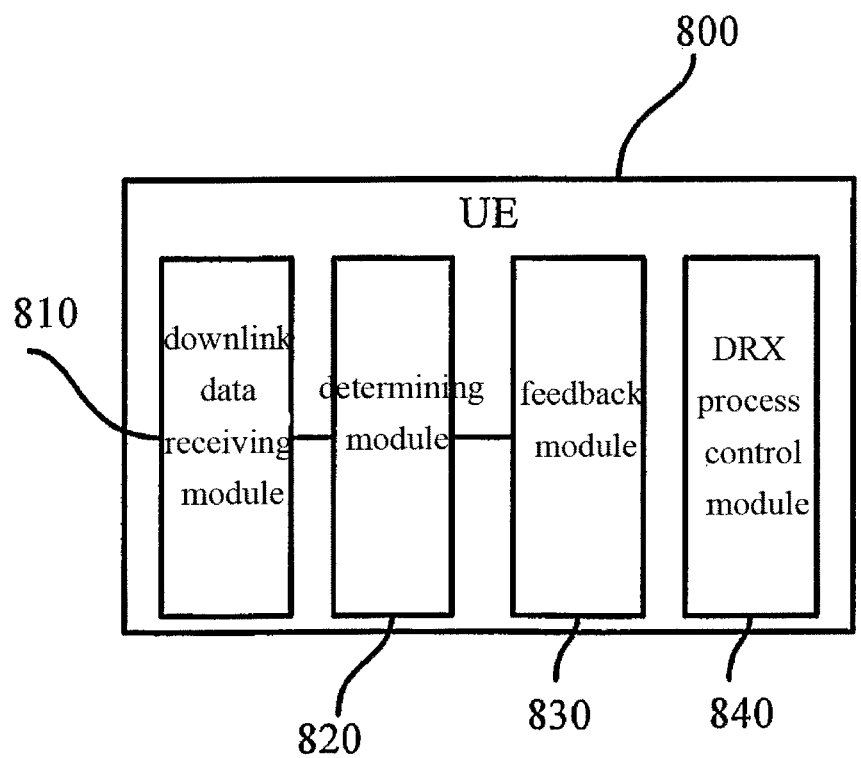
FIG. 8 shows the structure of the UE according to the second embodiment of the present invention.

FIG. 8 shows the structure of an UE according to the second embodiment of the present invention. The UE includes a downlink data receiving module 810, a determining module 820, a feedback module 830 and a DRX process control module 840. The downlink data receiving module 810 is configured for receiving the downlink data transmitted by the eNB. The determining module 820 is configured for determining whether the downlink data transmission is successful or not. The feedback module 830 is configured for feeding ACK back to the eNB when the determining module 820 determines that the downlink data transmission is successful, and is configured for feeding NACK back to the eNB when the determining module 820 determines that the downlink data transmission is unsuccessful and starting the HARQ RTT Timer. The DRX process control module 840 is configured for controlling the DRX process according to the HARQ RTT Timer and starting the Retransmission Timer after the HARQ RTT Timer expires.

In one embodiment of the present invention, the timing of RTT Timer is k+4 sub-frames, wherein k represents the interval between the downlink data transmission and the related HARQ feedback transmission. In particular, k sub-frames may include the transmission time of downlink data (e.g. 1 sub-frame), the maximum delay of data processing of UE (e.g. 3 sub-frames), as well as waiting time (as uplink and downlink sub-frames do not appear at the same time in TDD system, the UE has to wait for sub-frames in the suitable direction, for example the UE has to wait for uplink sub-frames for transmitting feedback of HARQ). In addition, 4 sub-frames may include the delay for transmitting the related HARQ feedback of UE (e.g. 1 sub-frame) and the maximum delay of data processing of eNB (e.g. 3 sub-frames).

In one embodiment of the present invention, the timing of the HARQ RTT Timer is the sum of feedback transmission time of UE and the delay of data processing of eNB.

By re-defining the RTT Timer, the present invention can improve power saving performance of the UE in TDD system effectively.

Although embodiments of the present invention are shown and described, for a person skilled in the art, it is to be understood that all kinds of changes, modifications, replacements and variations can be made to these embodiments without departing from the principle and spirit of the present invention. The scope of the present invention is defined by the appended claims and their equivalents.

The invention claimed is:

1. A method for enhancing power saving performance of UE, comprising the following steps:
the UE receiving downlink data transmitted by an evolved node B (eNB);
the UE starts a corresponding round trip time (RTT) Timer according to the received downlink data, wherein the timing of the RTT Timer is determined by the UE based on the uplink/downlink (UL/DL) configuration and the sub-frame number of the downlink sub-frame carrying the downlink data, wherein the timing is determined as k+4 sub-frames based on the UL/DL, configuration and the sub-frame number of the downlink sub-frame carrying the downlink data, wherein k represents the interval between the downlink data transmission and the related HARQ feedback transmission, and wherein k sub-frames include the transmission time of downlink data, the maximum delay of data processing of the UE, is well as waiting time, and 4 sub-frames include the delay for transmitting the related HARQ feedback of the UE and the maximum delay of data processing of the eNB, and wherein, when the delay of data processing of the eNB is 3ms, the UE determining the timing of the RTT Inner based on the uplink/downlink configuration and the sub-frame number of the downlink sub-frame carrying the downlink data comprises:
UE inquiring the following table based on the UL/DL configuration and the sub-frame Number of the downlink sub-frame carrying the downlink data to determine the timing of the RTT Timer,

|  |  | Sub-frame number | | | | | | | | | |
|---|---|---|---|---|---|---|---|---|---|---|---|
|  |  | 0 | 1 | 2 | 3 | 4 | 5 | 6 | 7 | 8 | 9 |
| UL/DL configuration | 0 | 8 | 10 | — | — | — | 8 | 10 | — | — | — |
|  | 1 | 11 | 10 | — | — | 8 | 11 | 10 | — | — | 8 |
|  | 2 | 11 | 10 | — | 8 | 12 | 11 | 10 | — | 8 | 12 |
|  | 3 | 8 | 15 | — | — | — | 11 | 10 | 10 | 9 | 9 |
|  | 4 | 16 | 15 | — | — | 12 | 11 | 11 | 10 | 9 | 8 |
|  | 5 | 16 | 15 | — | 13 | 12 | 11 | 10 | 9 | 8 | 17 |
|  | 6 | 11 | 11 | — | — | — | 11 | 11 | — | — | 9; | the UE controlling a discontinuous reception (DRX) process according to the RTT Timer.

2. The method for enhancing power saving performance of UE according to claim 1 wherein the timing of the RTT Timer is the sum of the downlink data transmission time, the delay of data processing of the UE, the feedback transmission time of the UE and the delay of data processing of the eNB.

3. A user equipment (UE), comprising a downlink data receiving module, a Timer start module, and a discontinuous reception (DRX) process control module, wherein, the downlink data receiving module is configured for receiving downlink data transmitted by an evolved node B (eNB);
the Timer start module is configured for starting a corresponding round trip time (RTT) Timer according to the downlink data received by the downlink data receiving module, wherein the timing of the RTT Timer is determined based on the uplink/downlink (MIDI) configuration and the sub-frame number of the downlink sub-frame carrying the downlink data by the UE, wherein, the Timer start module determines the timing to be k+4 sub-frames based on the UL/DL configuration and the sub-frame number of the downlink sub-frame carrying the downlink data,
wherein k represents the interval between the downlink data transmission and the related HARQ feedback transmission, and wherein k sub-frames include the transmission time of downlink data, the maximum delay of data processing of the UE, as well as waiting time, and 4 sub-frames include the delay for transmitting the related HARQ feedback of the UE and the maximum delay of data processing of the eNB, wherein, when the delay of data processing of eNB is 3ms, the timing of the RTT Timer is determined by inquiring the following table based on the UL/DL configuration and the sub-frame number of the downlink sub-frame carrying the downlink data.

|  |  | Sub-frame number | | | | | | | | | |
| --- | --- | --- | --- | --- | --- | --- | --- | --- | --- | --- | --- |
|  |  | 0 | 1 | 2 | 3 | 4 | 5 | 6 | 7 | 8 | 9 |
| UL/DL configuration | 0 | 8 | 10 | — | — | — | 8 | 10 | — | — | — |
|  | 1 | 11 | 10 | — | — | 8 | 11 | 10 | — | — | 8 |
|  | 2 | 11 | 10 | — | 8 | 12 | 11 | 10 | — | 8 | 12 |
|  | 3 | 8 | 15 | — | — | — | 11 | 10 | 10 | 9 | 9 |
|  | 4 | 16 | 15 | — | — | 12 | 11 | 11 | 10 | 9 | 8 |
|  | 5 | 16 | 15 | — | 13 | 12 | 11 | 10 | 9 | 8 | 17 |
|  | 6 | 11 | 11 | — | — | — | 11 | 11 | — | — | 9; | the DRX process control module is configured for controlling the DRX process according to the RTT Timer.

4. The UE according to claim 3 wherein the timing of the RTT Timer is the sum of the downlink data transmission time, the delay of data processing of the UE, the feedback transmission time of the UE and the delay of data processing of the eNB.

5. A method for enhancing power saving performance of UE comprising the following steps:

the UE receiving downlink data transmitted by an evolved node B (eNB);

when the UE determines that the downlink data transmission is not successful, the UE feeding NACK back to the eNB and starting a round trip time (RTT) Timer, wherein the timing of the RTT Timer is determined by the UE based on the uplink/downlink (UL/DL) configuration and the sub-frame number of the downlink sub-frame carrying the downlink data, and wherein the timing of the RTT Timer is k+4 sub-frames and k represents the interval between the downlink data transmission and the related HARQ feedback transmission, and wherein k sub-frames include the transmission time of downlink data, the maximum delay of data processing of the UE, as well as waiting time, and 4 sub-frames include the delay for transmitting the related HARQ feedback of the UE and the maximum delay of data processing of the eNB, and wherein, when the delay of data processing of the eNB is 3ms, the UE determining the timing of the RTT Timer based on the uplink/downlink configuration and the sub-frame number of the downlink sub-frame carrying the downlink data comprises:

the UE Inquiring the following table based on the UL/DL configuration and the sub-frame number of the downlink sub-frame carrying the downlink data to determine the timing of the RTT Timer,

|  |  | Sub-frame number | | | | | | | | | |
| --- | --- | --- | --- | --- | --- | --- | --- | --- | --- | --- | --- |
|  |  | 0 | 1 | 2 | 3 | 4 | 5 | 6 | 7 | 8 | 9 |
| UL/DL configuration | 0 | 8 | 10 | — | — | — | 8 | 10 | — | — | — |
|  | 1 | 11 | 10 | — | — | 8 | 11 | 10 | — | — | 8 |
|  | 2 | 11 | 10 | — | 8 | 12 | 11 | 10 | — | 8 | 12 |
|  | 3 | 8 | 15 | — | — | — | 11 | 10 | 10 | 9 | 9 |
|  | 4 | 16 | 15 | — | — | 12 | 11 | 11 | 10 | 9 | 8 |
|  | 5 | 16 | 15 | — | 13 | 12 | 11 | 10 | 9 | 8 | 17 |
|  | 6 | 11 | 11 | — | — | — | 11 | 11 | — | — | 9; | the UE controlling the discontinuous reception (DRX) process according to the RTT Timer and starting a Retransmission Timer after the RTT Timer expires.

6. The method for enhancing power saving performance of UE according to claim 5 wherein the timing of the RTT Timer is the sum of feedback transmission time of the UE and the delay of data processing of the eNB.

7. A user equipment (UE), comprising a downlink data receiving module, a determining module, a feedback module and a discontinuous reception (DRX) process control module wherein the downlink data receiving module is configured for receiving downlink data transmitted by an evolved node B (eNB);

the determining module is configured for determining whether the downlink data transmission is successful or not;

the feedback module is configured for feeding ACK back to the eNB when the determining module determines that the downlink data transmission is successful, and is configured for feeding NACK back to the eNB when the determining module determines that the downlink data transmission is unsuccessful and starting a round trip time (RTT) Timer, wherein the timing of the RTT Timer is determined based on the uplink/downlink (UL/DL) configuration and the sub-frame number of the downlink sub-frame carrying the downlink data by the UE, and wherein the timing is determined as k+4 sub-frames based on the UL/DL configuration and the sub-frame number of the downlink sub-frame carrying the downlink data, wherein k represents the interval between the downlink data transmission and the related HARQ feedback transmission; and wherein, when the delay of data processing of the eNB is 3ms, the UE determining the timing of the RTT Timer based on the uplink/downlink configuration and the sub-frame number of the downlink sub-frame carrying the downlink data comprises:

the UE inquiring the following table based on the UL/DL configuration and the sub-frame number of the downlink sub-frame carrying the downlink data to determine the timing of the RTT Timer,

|  |  | Sub-frame number | | | | | | | | | |
| --- | --- | --- | --- | --- | --- | --- | --- | --- | --- | --- | --- |
|  |  | 0 | 1 | 2 | 3 | 4 | 5 | 6 | 7 | 8 | 9 |
| UL/DL configuration | 0 | 8 | 10 | — | — | — | 8 | 10 | — | — | — |
|  | 1 | 11 | 10 | — | — | 8 | 11 | 10 | — | — | 8 |
|  | 2 | 11 | 10 | — | 8 | 12 | 11 | 10 | — | 8 | 12 |
|  | 3 | 8 | 15 | — | — | — | 11 | 10 | 10 | 9 | 9 |
|  | 4 | 16 | 15 | — | — | 12 | 11 | 11 | 10 | 9 | 8 |
|  | 5 | 16 | 15 | — | 13 | 12 | 11 | 10 | 9 | 8 | 17 |
|  | 6 | 11 | 11 | — | — | — | 11 | 11 | — | — | 9; |

DRX process control module is configured for controlling the DRX process according to the RTT Timer and starting a Retransmission Timer after the RTT Timer expires.

8. The UE according to claim 7 wherein the timing of the RTT Timer is the sum of feedback transmission time of the UE and the delay of data processing of the eNB.

\* \* \* \* \*

UNITED STATES PATENT AND TRADEMARK OFFICE
CERTIFICATE OF CORRECTION

PATENT NO. : 8,675,530 B2  
APPLICATION NO. : 13/127210  
DATED : March 18, 2014  
INVENTOR(S) : Guoqing Li, Li Chen and Zhuo Gao Page 1 of 1

It is certified that error appears in the above-identified patent and that said Letters Patent is hereby corrected as shown below:

In the claims:

Column 9, line 66, Claim 1; delete "is well" and replace with --as well--;  
Column 10, line 10, Claim 1; delete "Number" and replace with --number--;  
Column 10, line 46, Claim 3; delete "(MIDI)" and replace with --(UL/DL)--; and  
Column 11, line 32, Claim 5; delete "interva1" and replace with --interval--.

Signed and Sealed this  
Tenth Day of June, 2014

Michelle K. Lee  
*Deputy Director of the United States Patent and Trademark Office*